United States Patent [19]

Milik

[11] 3,863,904
[45] *Feb. 4, 1975

[54] MIXING OF FRAGILE GRANULAR MATERIALS

[75] Inventor: Rudolf Ferdinand Leon Milik, Welwyn Garden City, England

[73] Assignee: Design Link, Little Burrow, Welwyn Garden City, Hertfordshire, England

[ * ] Notice: The portion of the term of this patent subsequent to Aug. 7, 1990, has been disclaimed.

[22] Filed: Jan. 5, 1973

[21] Appl. No.: 321,225

[30] Foreign Application Priority Data
Jan. 18, 1972  Great Britain...................... 2395/72

[52] U.S. Cl.................. 259/148, 259/8, 259/44, 259/161
[51] Int. Cl. .................. B01f 3/08, B01f 7/26
[58] Field of Search........... 259/3, 8, 14, 23, 24, 30, 259/43, 44, 50, 57, 58, 66, 67, 81, 82, 15, 16, 31, 32, 33, 34, 146, 161, 162, 163, 164, 165, 148; 106/DIG. 2, 98; 117/100 B

[56] References Cited
UNITED STATES PATENTS

| | | | |
|---|---|---|---|
| 3,580,551 | 5/1971 | Hammann.......................... | 259/30 X |
| 3,671,296 | 6/1972 | Funakoshi.......................... | 259/8 X |
| 3,711,319 | 1/1973 | Irikura......................... | 117/100 B X |
| 3,718,491 | 2/1973 | Yates.......................... | 106/DIG. 2 X |
| 3,751,011 | 8/1973 | Milik................................... | 259/146 |

OTHER PUBLICATIONS

Urquhart, Civil Engineering Handbook, 1959, McGraw–Hill, p. 7-62.

*Primary Examiner*—Harvey C. Hornsby
*Assistant Examiner*—Alan Cantor
*Attorney, Agent, or Firm*—Brisebois & Kruger

[57] ABSTRACT

Two or more materials, at least one of which is of a granular nature and has a bulk density of less than 70 lb per cubic foot are mixed together by supplying the materials onto a dish-shaped circular surface which is free of projections, closely surrounding the edge of the circular surface with a wall which extends upwards from the surface and rotating the surface with the materials upon it and thus flinging the materials outwards centrifugally and causing them, but the dished shape of the surface, to be deflected upwards over the face of the wall which slows down the rotation applied to the materials by the rotating surface and directs the materials inwards again towards the centre of the surface whence they are again flung centrifugally outwards so that the materials form a toroidally shaped mass around the edge of the surface and the materials circulate around the toroid following a helical path.

4 Claims, 1 Drawing Figure

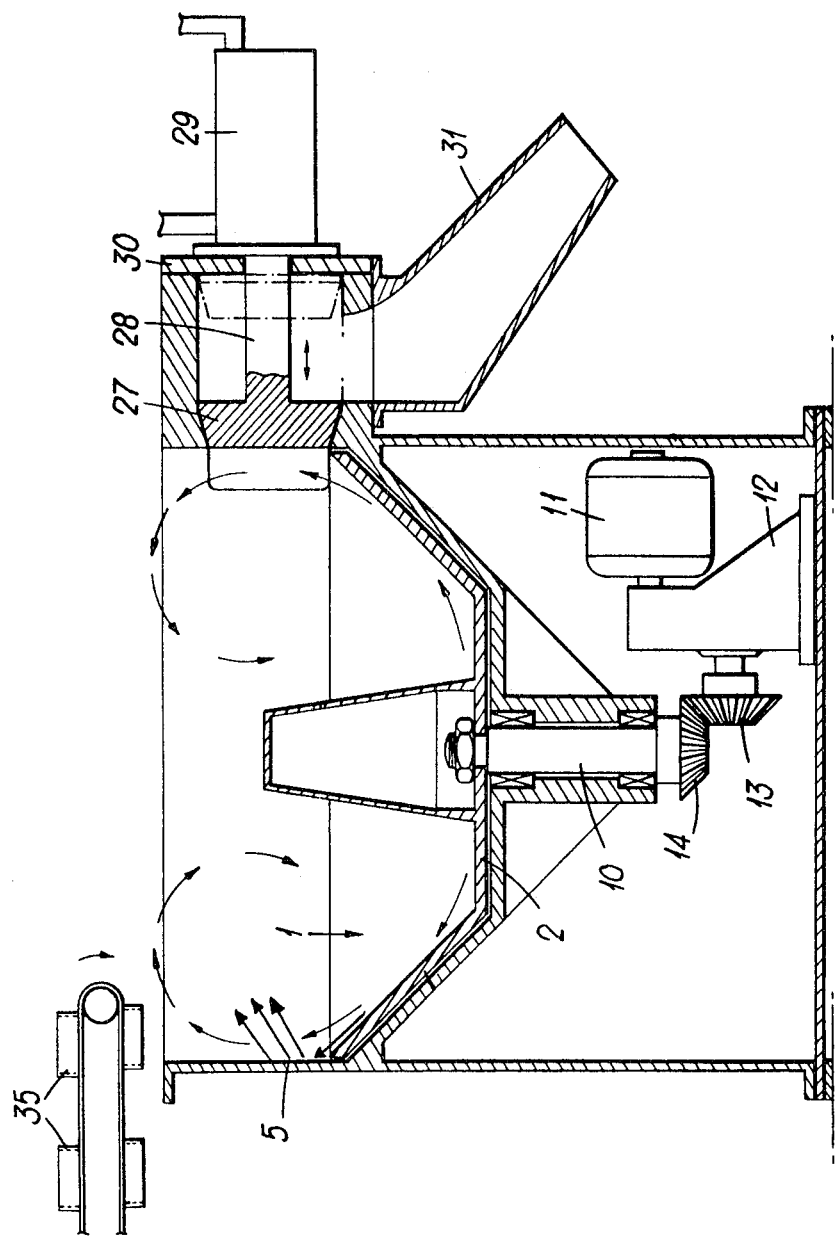

MIXING OF FRAGILE GRANULAR MATERIALS

The mixing of granular materials of a low density of less than 70 lb per cubic foot, and often therefore of a fragile nature, with other materials such as powders or liquids has in the past caused great difficulties. If a conventional high speed mixer employing rotating blades is used, the granules tend to be broken up so that the whole mixture tends to consist of a fine powder. On the other hand if tumbler mixers are used, the mixing process is extremely slow and in many cases it is not possible to obtain a mixture of satisfactory homogeneity. Further, even tumbler mixers tend to break up the granules particularly when these are being mixed with other granular material of similar particle size but of substantially greater density.

It has now been discovered that by using a form of apparatus which has not previously been used for mixing purposes, two or more materials, at least one of which is of a granular nature and has a bulk density of less than 70 lb per cubic foot can be mixed together extremely rapidly and efficiently to produce a homogeneous mixture and with little or no fracturing of the granules of the light material.

The FIGURE is a schematic, vertical axial view taken through the apparatus.

According to the present invention, two or more materials, at least one of which is of a granular nature having a bulk density of less than 70 lb per cubic foot are mixed together by supplying the materials to an apparatus comprising a rotary dished platform 1, which is rotatable about a vertical central axis 10, and a wall which closely surrounds and extends upwards from the rim of the platform but which does not partake of the rotation of the platform, and then rotating the platform with the materials upon it by means of a motor 11 through gear train 12, 13, 14.

Preferably the surrounding wall is held stationary although it may as an alternative rotate in the same direction as, but more slowly than, the platform, or it may rotate counter to the platform.

With this arrangement, the materials to be mixed are flung outwards centrifugally and, owing to the dished shape of the platform 1, the materials are forced upwards against the surrounding wall 5. The contact of the materials with the wall tends to decrease their speed and to direct the materials inwards again towards the centre of the platform where the materials fall downwards onto the bottom 2 of the platform and are then flung outwards once again. The result is that the materials tend to form a toroidally shaped mass around the edge of the platform and the materials circulate around the toroid following a helical path. The movement of the materials around this path is of an extremely complex nature and the differential speeds of particle movement of the various materials vary so much that extremely rapid mixing together of the materials results giving rise to a uniform mixture in a matter of only a few seconds.

The rotation of the platform is impressed on the materials on the platform by frictional forces between the surface of the platform and the materials and the platform itself is entirely free of blades or other similar projections and it is for this reason that no fracturing of the fragile granular material having a density of less than 70 lb per cubic foot takes place.

The form of apparatus comprising a rotary dished platform and the surrounding stationary wall is known, but it has in the past only been used for grinding powdered material or for surface finishing metal workpieces which are held in a holder above the platform and have grinding chips circulated over them by rotating the platform.

The apparatus adapted for mixing purposes preferably includes, in addition to the rotary platform and the surrounding wall, conveyors 35 or other means for supplying the materials to be mixed together to the platform and means (27, 28, 29, 30, 31) for discharging the materials after they have been mixed together. Such an apparatus is described and claimed in our copending application Ser. No. 216,054 filed Jan. 7, 1972, now U.S. Pat. No. 3,820,760.

It has been found that the speed of rotation of the dished platform may vary over quite wide limits, but preferably the speed of rotation is such that the peripheral speed of the platform is from 400 to 2500 feet per minute. This corresponds to an angular speed of from about 60 to about 400 revolutions per minute with a platform having a diameter of 2 feet.

One example of a material which can be very effectively mixed with other materials by the method in accordance with the invention is Perlite, which is an expanded and fragile particulate mineral capable of withstanding high temperatures and therefore useful for forming thermal insulation. Perlite may be incorporated into cement bonded structures or coatings, but besides being extremely fragile, it is very water absorbent so that when it is mixed with cement and water, so much water is required that the curing of the cement is impaired and the strength of the structural coating is rather low. For this reason it is desirable to coat the Perlite granules with a water resistant material to seal them before they are mixed with the cement and water. A suitable coating material is sodium silicate in the form of a viscous liquid which subsequently hardens on exposure to carbon dioxide in the atmosphere.

Examples of the mixing of Perlite with sodium silicate and other methods for mixing in accordance with the invention using any one of the pieces of apparatus described and illustrated in co-pending application Ser. No. 216,054 filed Jan. 7, 1972 with a platform diameter of 2 feet and a mixing time of only a few seconds are as follows:

Example I

Perlite having a bulk density of 8 lb per cubic foot together with 12 percent of its own weight of sodium silicate in the form of a viscous liquid was supplied to the platform of the machine and on rotating the platform at a speed of 300 rpm, the Perlite particles became uniformly coated with the sodium silicate in 6 seconds and the mixing occurred without causing the Perlite granules to form conglomerates and without any appreciable breaking up of the granules. The rapid coating of the granules in this way is of great importance because the coating must be completed before the sodium silicate has a chance to harden.

Example II

Perlite particles coated in the manner described in Example I with the sodium silicate coating hardened by exposure to the atmosphere were supplied to the platform of the machine together with Portland cement and water in the proportions of 5:3:1 by volume of Perlite, cement and water respectively. The platform was rotated at a speed of 300 rpm for a period of 7 seconds and a uniform mixture was produced again without breaking up any of the coated Perlite granules. It is most important that breaking of the Perlite granules should be avoided as, if they were broken after they had been coated, the fractured surfaces would cause the Perlite to absorb water from the mix and render the mixture unworkable.

Example III

Vermiculite which is another expanded granular mineral material having a bulk density of 4.5 lb per cubic foot was supplied to the platform of the machine together with Portland cement and water in the same proportions as in Example II. The platform was rotated at a speed of 250 rpm for 5 seconds and a uniform mixture was produced without breaking up any of the Vermiculite particles.

Example IV

The same procedure as in Example 3 was carried out except that mineral ash aggregate having a bulk density of 60 lb per cubic foot was substituted for the Vermiculite.

Example V

Wood chips having a bulk density of 10 lb per cubic foot and epoxy resin in the form of a viscous liquid were supplied to the platform of the machine in proportions by weight of 9:1 of wood and resin respectively. The platform was rotated at a speed of 350 rpm for a period of 7 seconds. The resin, which contained a hardener was found to be uniformly mixed with the wood chips and the mixture was subsequently moulded and compressed for the production of chipboard.

Other examples of mixtures which may be made in accordance with the invention are the compounding of cattle food consisting of granules of vegetable matter with very small quantities of vitamins or other chemical additives; the production of dried soup mixes where granules of dried vegetables are mixed with finely divided powdered herbs or spices, and in the confectionary industry where granular materials such as edible balls of a honeycomb nature are coated with a liquid chocolate or other liquid coating or with a coating of powdered material such as icing sugar.

I claim:

1. A method of mixing together at least two materials, at least one of which is in the form of fragile granules having a bulk density of less than about 70 lb per cubic foot, said method comprising the steps of supplying said materials to a circular dish-shaped surface, having an inclined peripheral portion which is substantially free of projections and has its edge surrounded by a wall surface extending directly substantially vertically upwardly at an obtuse but sharply defined angle to said peripheral portion, holding said wall surface stationary while rotating said dish-shaped surface about a vertical central axis at a peripheral speed of from about 400 to about 2500 feet per minute and for a period of from the order of 5 to the order of 7 seconds and thereby imparting a rotation to said materials and flinging said materials centrifugally outwards and upwards against said stationary wall surface, contact with said wall surface retarding said rotation of said materials and directing said materials inwards towards said axis whence they fall downwards again onto said dish-shaped surface, whereby said materials form a toroidally shaped mass around said peripheral portion of said dish-shaped surface and said materials circulate along a helical path around said toroidally shaped mass.

2. A method as claimed in claim 1, wherein said granular material is Perlite.

3. A method as claimed in claim 2, in which said materials include, in addition to said Perlite, sodium silicate in the form of a viscous liquid.

4. A method as claimed in claim 1, in which said granular material is Vermiculite.

* * * * *